Oct. 30, 1928.
S. H. BROOKS
1,689,941
LIQUID LEVEL INDICATOR
Filed Dec. 23, 1922
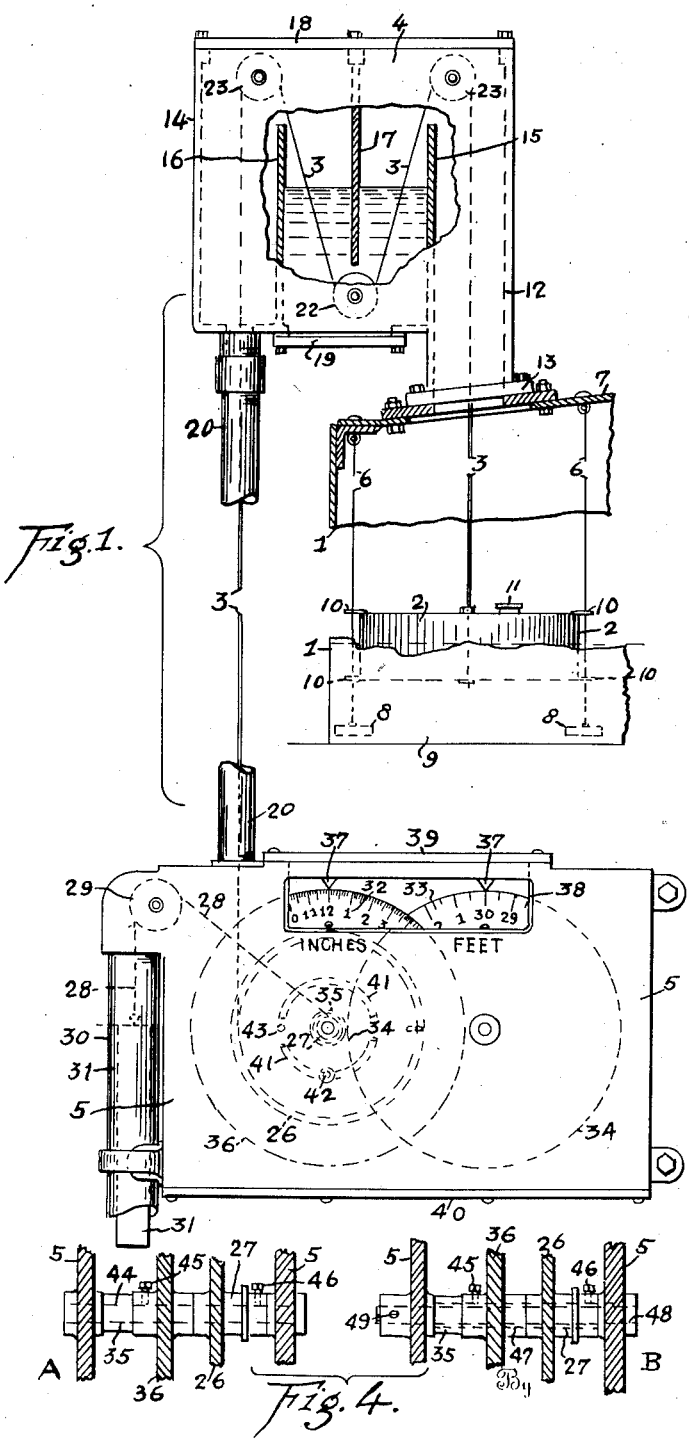
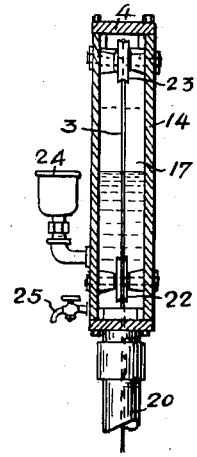
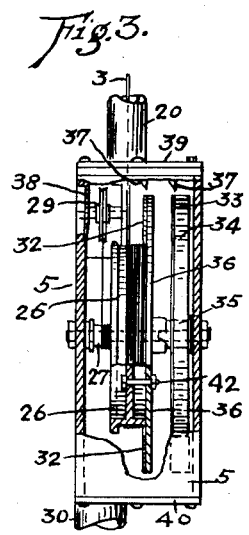
Stephen H. Brooks, Inventor
By N. S. Amstutz
Attorney Patented Oct. 30, 1928.

1,689,941

UNITED STATES PATENT OFFICE.

STEPHEN H. BROOKS, OF CLEVELAND, OHIO, ASSIGNOR TO THE OIL CONSERVATION ENGINEERING COMPANY, OF CLEVELAND, OHIO, A CORPORATION OF OHIO.

LIQUID-LEVEL INDICATOR.

Application filed December 23, 1922. Serial No. 608,676.

My invention relates to improvements in liquid level gauges and it more especially consists of the features pointed out in the annexed claims.

The purpose of my invention is to provide a liquid level gauge that will function under all conditions without the loss of any vapors that may accumulate above the oil surface within the tank; that is simple in construction and quite positive in action; that indicates on separate dials in inches and feet; that provides means for setting the indicators at zero when a gauge is installed making it adaptable to all the varying conditions found in actual practice; that effectually encloses all the working parts so as to protect them from interfering weather conditions etc.; and that provides means for keeping the float from shifting sideways on the oil surface.

With these and other ends in view, I illustrate in the accompanying drawing such instances of adaptation as will disclose the broad underlying features without limiting myself to the specific details shown thereon and described herein.

Figure 1 is a diagrammatic elevation partly in section showing the relation of the gauge, the liquid seal and connections to the float within the tank.

Fig. 2 is a transverse elevation of the liquid seal in section.

Fig. 3 is a transverse elevation of the indicator partly in section.

Fig. 4, A—B, illustrate in fragmentary sectional views alternative mountings for the indicating drum and dial disk.

In practically carrying out the construction of my gauges, I may use various alternative expedients without departing from the spirit of my invention. I am aware that float controlled indicators have been used in tanks of various kinds as instanced in well-known railway water supply tanks, but I am not aware that the features which I disclose herein have been proposed or used prior to my invention thereof. Gauges of the type illustrated in the accompanying drawing are specially serviceable in connection with large oil or similar tanks wherein a very small change of level of the contents represents a very large variation in barrels, gallons or cubic feet, etc. Gauges of the ordinary float type would not indicate such minute fluctuations. With gauges as sensitive as the ones herein disclosed, it is possible to check up vaporization and other similar losses that without such provision would pass unnoticed.

Within an oil tank 1 a suitable float 2 is suspended on a cable 3 which connects the float through a liquid seal 4 to an indicating mechanism enclosed in a casing 5. The float is held against side movement by means of two guide cables 6 anchored to the under side of the tank roof 7. These cables are held taut by weights 8 secured to their lower ends so as to just be free from the tank bottom 9. There are suitable eyes 10 formed on the float through which the cables 6 pass. If required a screw cap 11 may be made a part of the float.

The liquid seal 4 has a hollow standard 12 formed integrally with a flanged foot 13 by means of which it is secured to the tank roof 7 in a gas tight manner. The hollow standard 12 is a part of a casing 14 in which there are three partitions, two outside ones 15 and 16 and a center partition 17. A cover 18 is held on the casing by suitable bolts, and a clean-out cover 19 is secured to the bottom of the overhanging portion of the casing. The partition 17 terminates below the top of the partitions 15 and 16, thus forming a trap when the space between the partitions is filled with oil to a level above the bottom edge of the partition 17. A pipe 20 leads from the bottom of the casing 14 to the top of the indicator casing 5. The cable 3 passes up through the hollow column 12, over sheave 23, then downward between partitions 15 and 17, under the sheave 22, thence upward between partitions 17 and 16, over sheave 23, and down through pipe 20 to the indicator. An oil filling cup 24 is suitably attached to the casing 14 and a drain outlet 25 may also be placed on the casing 14, if desired. The sheaves 22 and 23 may roll on stationary spindles as desired.

The indicator portion of my gauge is enclosed by casing 5. This casing is supported on the tank 1 in any suitable manner, not shown, so that the cable 3 in its descent from the liquid trap 4 will be in a straight vertical line. It is secured to and passes around a flange drum 26 whose circumference is representative of a change of twelve inches in the oil level of the tank 1. A small drum 27 is formed on the hub of the drum 26. On this, secured in any suitable manner, not shown, is a cable 28. This passes over a sheave 29 into a pipe 30 wherein it is attached to a counterweight 31. This counterweight partially off-sets the weight of the float 2 so that the drum 26 very sensitively and instantly responds to oil level fluctuations in the tank. An indicating dial 32, reading in inches, is attached to a suitable disk 36 that is adjustably connected to the drum 26. A second indicating dial 33, reading in feet, is attached to a gear 34 which meshes with a pinion 35 attached to the dial disk 32. Suitable pointers 37 coordinate with the dials 32 and 33. The upper portion of the dials, as well as the pointers 37, are visible through a window opening 38. The casing 5 may have a removable cover 39 and a removable bottom 40, if desired, to make the enclosed parts accessible for adjustment etc.

There are various ways in which the drum 26 may be adjusted in respect of the dial disk 36, and I do not limit myself to any specific means for accomplishing this result. When the device is installed on a specific tank, the float is dropped to its lowest position above the flat weights 8 and in contact therewith. The cable 3 is then pulled taut by means of the drum 26 while the drum is free from the dial disk 36. Without shifting the drum and cable the dial disk 36 is moved independently so as to bring the zero or starting point of the dials 32 and 33 opposite the pointers 37 when the dial disk 36 and the drum 26 are fastened to each other by any suitable means, an instance of which is described hereafter. From this time on the indicator will respond and indicate the level of the oil as it comes in or goes out.

In Fig. 1 a pair of concentric disconnected slots 41 are formed in the dial disk 36. A bolt 42 in the drum 26 is secured in the slots 41 by means of a cooperating nut according to the position required. If the cable itself is compensated in length for this adjustment the bolt 42 may be permanently placed in hole 43 at once without changing the relation of the drum to the disk.

In Fig. 4, A—B two alternative means of adjustment between the drum and the dial disk are shown. In A, a rotatable shaft 44 is used and in B a stationary shaft 48 is combined with a rotatable sleeve 47. In the former case the shaft 44 rotates in bearings formed in the walls of the casing 5. The dial disk 36 is mounted on the shaft 44 where it is held by a suitable set screw 45. The pinion 35 is fastened to the hub of the disk 36 in any suitable manner so as to rotate with the disk. The drum 26 has an extension hub formed beyond the small diameter drum 27. In this, one or more set screws 46 are placed, by means of which the position of the drum 26 may be changed in relation to the disk 36. The same result may be secured if the drum 36 remains undisturbed on the shaft 44 by changing the position of the disk 36 on the same shaft in relation to the drum and then fastening it by the set screw 45. In Fig. 4, B, the sleeve 47 takes the place of the shaft 44. A stationary shaft 48 passes through the sleeve and into openings formed in the casing 5 similar to the bearings of the shaft 44. The shaft is held in place by means of a pin 49. The dials 32 and 33 are secured respectively on the disks 36 and gear 34 in any suitable manner.

The use of oil as a liquid seal in the casing 14 is but an instance of adaptation and I do not limit myself to this expedient as any equivalent means which will prevent the escape of vapors from hermetically-sealed tanks through a cable outlet, without the use of oil is included in my invention. If the entire system including casing 5 and 14 and upright 12 with pipes 20 and 30 is made gas tight and pipe 30 is connected back into the tank 1, (not shown) similar to pipe 20 there will be no gas leakage. In consequence such an alternative is a practical substitute for the oil seal within the casing 14.

What I claim is:

1. In a liquid seal for tank gauges, the combination of a casing provided with two upwardly extending flanges mounted interiorly of the casing and extending to a height spaced below the top of said casing and forming a chamber to contain the sealing liquid, a partition wall attached to the casing top and extending into said chamber between said two flanges and into the sealing liquid, said casing having a hollow standard for tank attachment at one side of said liquid chamber, and having a second hollow portion on the other side of said liquid chamber for communication with an indicator, and cable guiding means mounted in said casing and adapted to guide a cable through said hollow standard and over one of said flanges into the liquid, below said partition wall and up through said liquid and over said other flange and down through said guide chamber.

2. In a liquid seal for tank gauges, the combination of a casing provided with two upwardly extending flanges mounted interiorly of the casing and extending to a height spaced below the top of said casing and forming a chamber to contain the sealing liquid, a partition wall attached to the casing top and extending into said chamber between said two flanges and into the sealing liquid, said casing having a hollow standard for tank attachment at one side of said liquid chamber, and having a second hollow portion on the other side of said liquid chamber for communication with an indicator, and cable guiding means consisting of a sheave mounted at the top of said hollow standard, a second sheave mounted in said liquid chamber below said partition wall and a third sheave mounted at the top of said guide chamber, said sheaves being adapted to guide a cable over said two flanges and below said partition walls to seal the cable.

In testimony whereof I affix my signature.

STEPHEN H. BROOKS.